US012142990B2

(12) United States Patent
Kitagawa et al.

(10) Patent No.: US 12,142,990 B2
(45) Date of Patent: Nov. 12, 2024

(54) ROTATING ELECTRIC MACHINE

(71) Applicants: TOYOTA JIDOSHA KABUSHIKI KAISHA, Toyota (JP); AISIN CORPORATION, Aichi (JP)

(72) Inventors: Katsuhide Kitagawa, Seto (JP); Akifumi Kurokawa, Kariya (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 237 days.

(21) Appl. No.: 17/729,259

(22) Filed: Apr. 26, 2022

(65) Prior Publication Data

US 2022/0416616 A1    Dec. 29, 2022

(30) Foreign Application Priority Data

Jun. 24, 2021  (JP) ................. 2021-104949

(51) Int. Cl.
*H02K 5/22*   (2006.01)
*H02K 11/25*  (2016.01)

(52) U.S. Cl.
CPC ............. *H02K 5/225* (2013.01); *H02K 11/25* (2016.01)

(58) Field of Classification Search
CPC ........ H02K 11/00; H02K 11/25; H02K 11/27; H02K 5/00; H02K 5/14; H02K 5/20; H02K 5/22; H02K 5/225; H02K 7/00; H02K 7/10; H02K 7/1008; H02K 7/20281; H02K 9/00; H02K 9/19; H02K 9/193; H02K 9/20; B60R 16/02; B60R 16/021; B60R 16/0215; H02G 3/32
See application file for complete search history.

(56) References Cited

U.S. PATENT DOCUMENTS

2016/0013705 A1    1/2016   Takei

FOREIGN PATENT DOCUMENTS

| CN | 108023432 B | * | 8/2019 |
|----|-------------|---|--------|
| EP | 2990270 A1  | * | 3/2016 |
| JP | 2016-019349 A | | 2/2016 |
| JP | 2018-042369 A | | 3/2018 |
| WO | 2019/208420 A1 | | 10/2019 |

* cited by examiner

*Primary Examiner* — Tran N Nguyen
(74) *Attorney, Agent, or Firm* — Oliff PLC

(57) ABSTRACT

A rotating electric machine includes a stator housed in a case, from which a power line is pulled out, and a temperature sensing element provided on the stator. The rotating electric machine includes a harness retainer that guides a wire harness that extends from the temperature sensing element, toward an inner circumferential wall of the case.

3 Claims, 11 Drawing Sheets

ROTATING ELECTRIC MACHINE

CROSS-REFERENCE TO RELATED APPLICATION

This application claims priority to Japanese Patent Application No. 2021-104949 filed on Jun. 24, 2021, incorporated herein by reference in its entirety.

BACKGROUND

1. Technical Field

The disclosure relates to a rotating electric machine.

2. Description of Related Art

A rotating electric machine is known in which a temperature sensing element is installed on stator windings provided on a stator (see, for example, Japanese Unexamined Patent Application Publication No. 2016-19349 (JP 2016-19349 A). The stator is housed in a case, and a wire harness that extends from the temperature sensing element is pulled out from the inside of the case to the outside, and is connected to a controller of the rotating electric machine. Also, power lines pulled out from the stator windings are connected to an inverter installed outside the case. In this case, there is a terminal block between the power lines and the inverter, and terminals provided at distal end portions of the power lines are connected to the terminal block. Each terminal is attached by welding to the distal end portion of the corresponding power line, and a weld is formed between the distal end portion of the power line and the terminal. The welds, along with the stator, are located in the case.

SUMMARY

Recently, the size of rotating electric machines has been getting smaller, and the space inside the case is being reduced accordingly. As a result, a wire harness extending from the temperature sensing element may interfere with a power line. If the interference between the wire harness and the power line arises, connection between the terminal of the power line and the terminal block may be loosened, or the weld between the distal end portion of the power line and the terminal may be damaged.

A rotating electric machine disclosed in the specification is provided for curbing interference between a wire harness and a power line in a case included in the rotating electric machine.

The rotating electric machine disclosed in the specification includes a stator from which a power line is pulled out and which is housed in a case, a temperature sensing element provided on the stator, and a harness retainer configured to guide a wire harness that extends from the temperature sensing element, toward an inner circumferential wall of the case.

In the rotating electric machine as described above, the harness retainer may be provided in a terminal block provided on the case, and the power line pulled out from the stator may be connected to the terminal block.

In the rotating electric machine as described above, the harness retainer may have a plate-like shape that extends from the terminal block to an inside of the case.

In the rotating electric machine as described above, the harness retainer may include an inclined portion where a width of the plate-like shape is reduced toward a distal end portion, when a direction parallel to a direction in which an axis of the stator extends is regarded as a direction of the width.

In the rotating electric machine as described above, the harness retainer may include a harness holding portion on a surface opposed to the inner circumferential wall of the case. The harness holding portion may be configured to allow the wire harness to enter.

The rotating electric machine disclosed in the specification can curb interference between the wire harness and the power line in the case included in the rotating electric machine.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
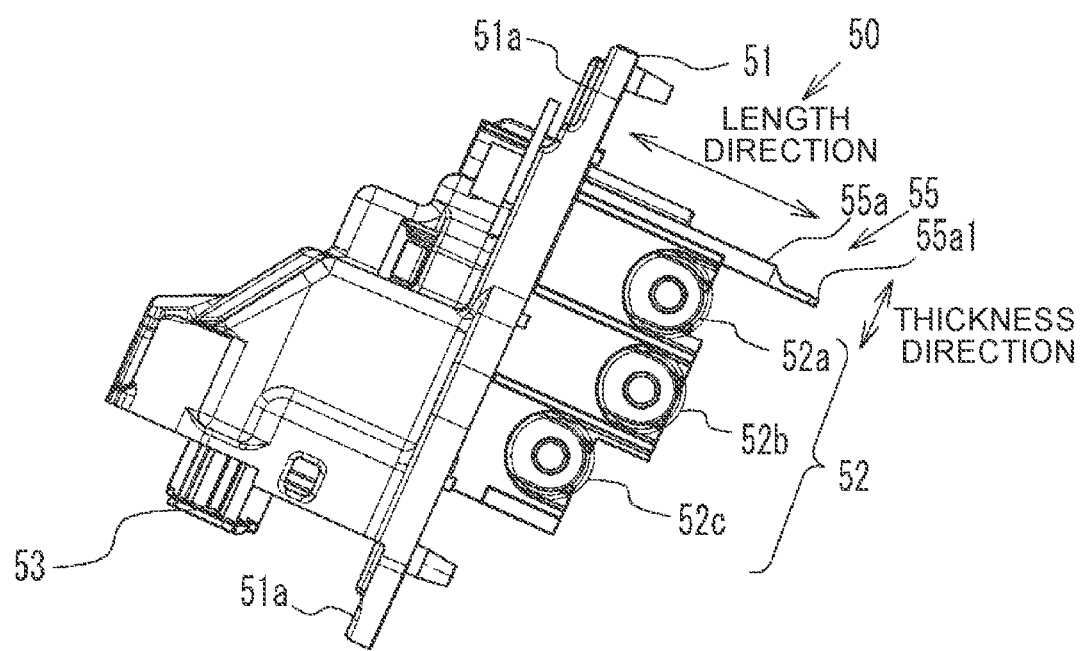
FIG. 1 is an explanatory view showing a terminal block that is provided with a harness retainer and is attached to a rotating electric machine of one embodiment.

One embodiment of the disclosure will be described with reference to the accompanying drawings. In the drawings, respective parts or components may not be illustrated such that their dimensions, proportions, etc. exactly match the actual ones. Also, some details may be omitted in some of the drawings.

EMBODIMENT

Configuration of Rotating Electric Machine

Figure 2:
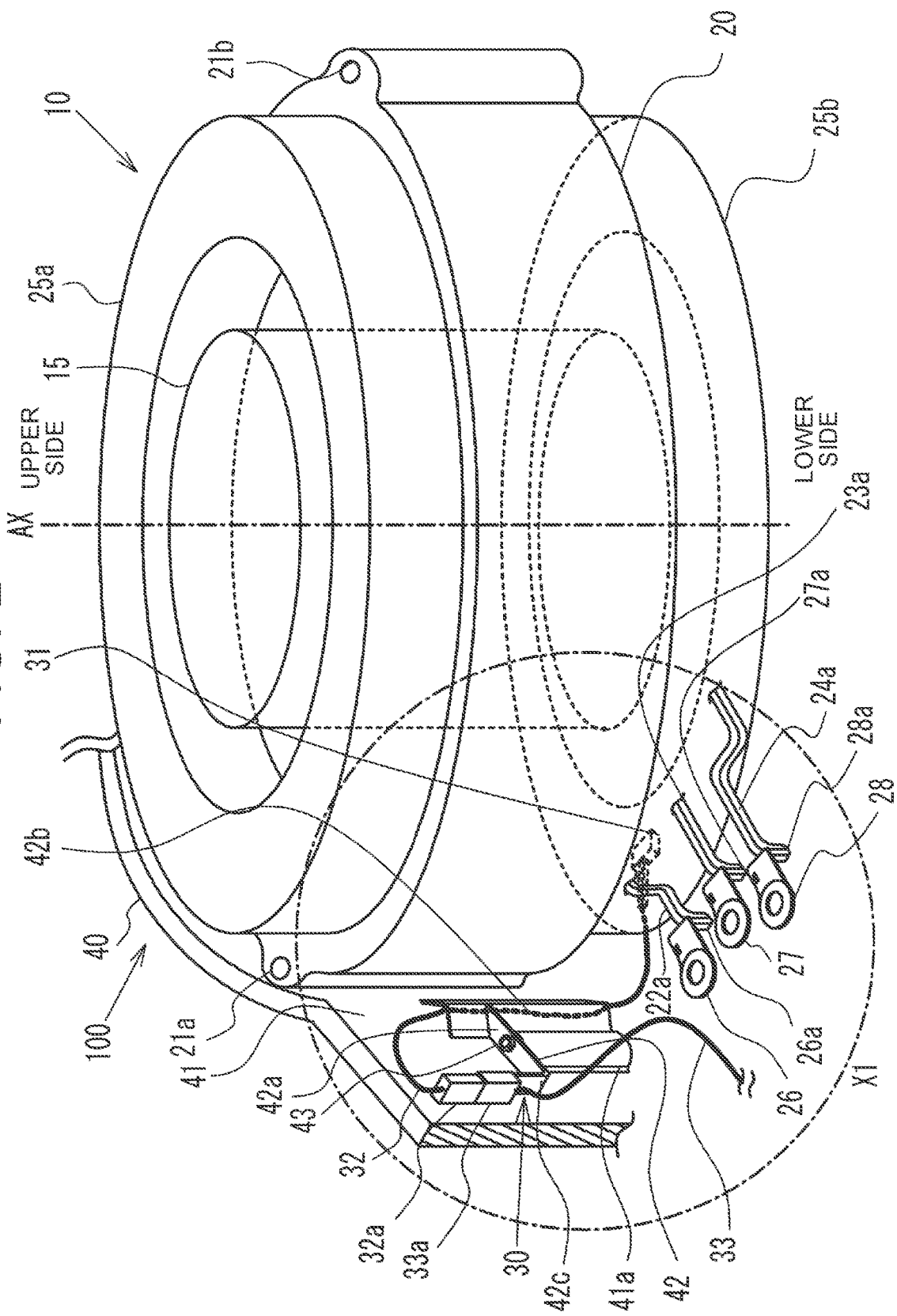
FIG. 2 is a perspective view showing the schematic configuration of a stator included in the rotating electric machine of the embodiment.

Initially, referring to FIG. 1 and FIG. 2, the configuration of a rotating electric machine 100 of one embodiment will be described. FIG. 1 illustrates a terminal block 50 attached to the rotating electric machine 100 of the embodiment, and FIG. 2 is a perspective view showing the schematic configuration of a stator 10 included in the rotating electric machine 100. In the following description, the direction in which the axis AX of the stator 10 extends as shown in FIG. 2 is denoted as the vertical direction. The rotating electric machine 100 is installed on a vehicle (automobile), and is used as a power source of the vehicle.

Referring to FIG. 1, the terminal block 50 includes a first connecting portion 52. The first connecting portion 52 includes a first U-phase connecting portion 52a, first V-phase connecting portion 52b, and first W-phase connecting portion 52c. Referring to FIG. 2, the rotating electric machine 100 includes the stator 10 and a rotor 15 disposed inside the stator 10. The axis of rotation of the rotor 15 coincides with the axis AX of the stator 10. A temperature sensor unit 30 for measuring the temperature of the stator 10 is attached to the stator 10. The stator 10 is housed in a case 40. The terminal block 50 is attached to the case 40 (see FIG. 9). A U-phase terminal 26 is connected to the first U-phase connecting portion 52a, a V-phase terminal 27 is connected to the first V-phase connecting portion 52b, and a W-phase terminal 28 is connected to the first W-phase connecting portion 52c. The connection relationship of these components will be described in detail later.

Configuration of Stator

Figure 3:
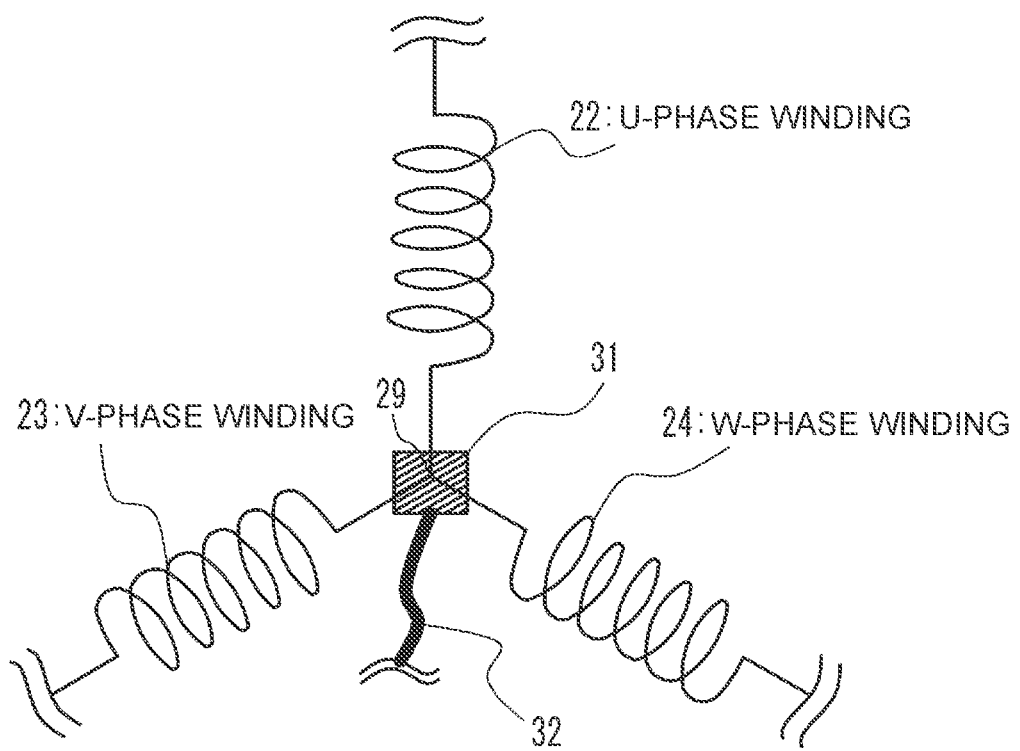
FIG. 3 is an explanatory view showing an example of three-phase wire connection formed in the stator included in the rotating electric machine of the embodiment.

Next, referring to FIG. 2 to FIG. 4, the stator 10 will be described. In FIG. 2, only the stator 10, a part of the case 40, and the temperature sensor unit 30 are depicted, and the rotor 15 is omitted. Referring to FIG. 2, the stator 10 includes a stator core 20. The stator core 20 is formed by stacking electromagnetic steel sheets punched into a predetermined shape. The stator core 20 is in the shape of a cylinder that is concentric with the rotational axis of the rotor 15. The stator core 20 is provided at its outer circumferential surface with bolt holes 21a, 21b used for connection with an object on which the rotating electric machine 100 is to be installed. The rotating electric machine 100 is a three-phase alternating-current (AC) motor that employs a star-shaped connection structure as its wire connection structure. In FIG. 3, which shows a part of the circuit diagram of the rotating electric machine 100, a U-phase winding 22, a V-phase winding 23, and a W-phase winding 24 that are arranged in a star shape (Y shape) are depicted. A thermistor 31 as a temperature sensing element is mounted at a neutral point 29 at which the U-phase winding 22, V-phase winding 23, and W-phase winding 24 are connected.

While FIG. 3 shows a part of the circuit diagram of the three-phase AC motor, the actual U-phase winding 22, V-phase winding 23, and W-phase winding 24 are formed by combining a multiplicity of U-shaped segment windings (not shown). The U-shaped segments are formed by covering a conductor such as copper with an insulator, and inserted in grooves (not shown) called slots provided on the inner circumferential surface of the stator core 20.

Referring to FIG. 2, an upper wiring end portion 25a protrudes on the upper-end side of the stator core 20 as viewed in the axis AX direction. The upper wiring end portion 25a is formed by parts of the U-phase winding 22, V-phase winding 23, and W-phase winding 24 protruding from the upper end face of the stator core 20. A lower wiring end portion 25b protrudes on the lower-end side of the stator core 20 in the axis AX direction. The lower wiring end portion 25b is formed by parts of the U-phase winding 22, V-phase winding 23, and W-phase winding 24 protruding from the lower end face of the stator core 20.

Figure 4:
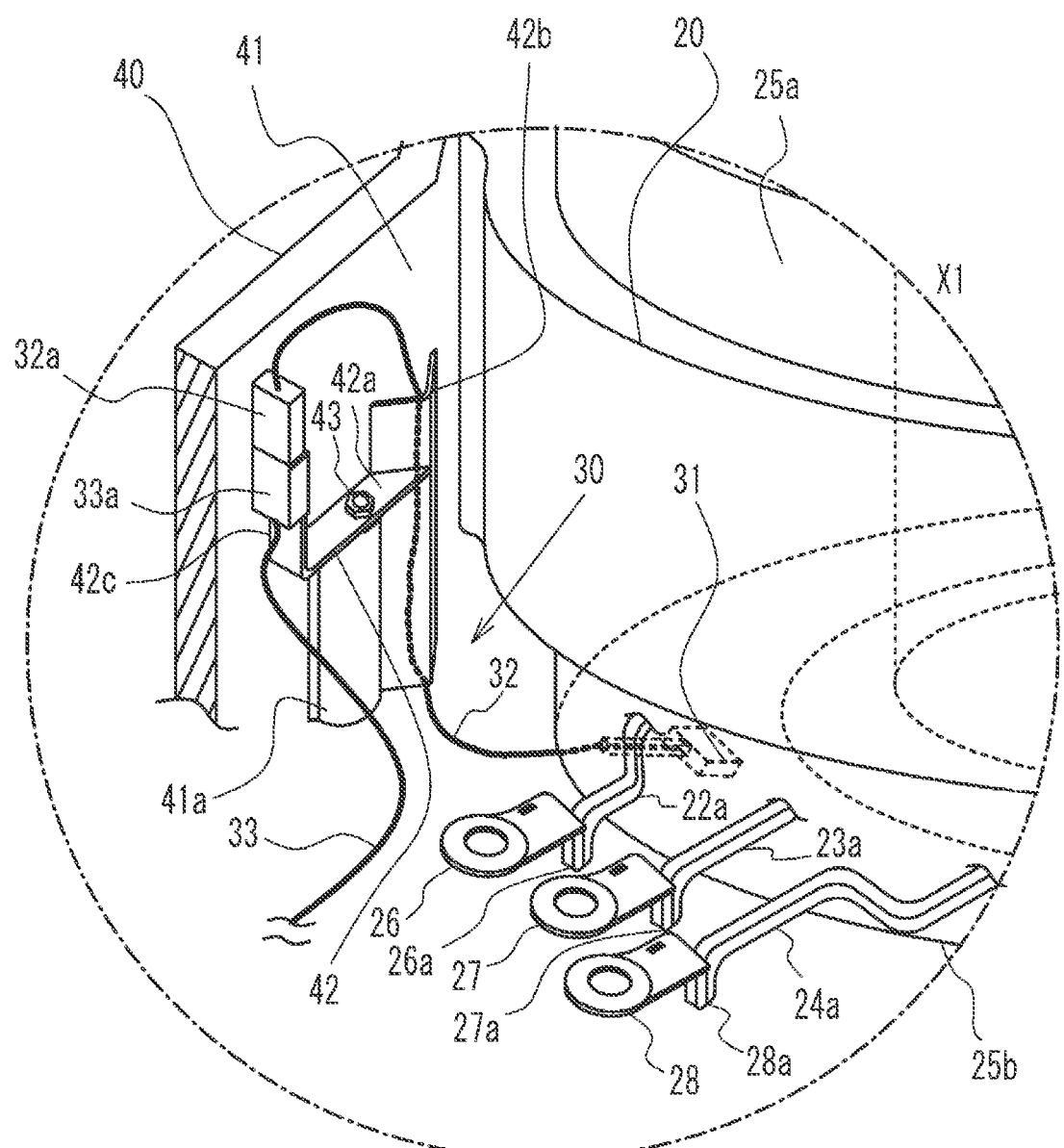
FIG. 4 is an enlarged view of a section denoted as X1 in FIG. 2.

As shown in FIG. 2 and FIG. 4, a U-phase power line 22a, V-phase power line 23a, and W-phase power line 24a are pulled out from the lower wiring end portion 25b. The U-phase terminal 26 is provided at an end portion of the U-phase power line 22a. The V-phase terminal 27 is provided at an end portion of the V-phase power line 23a. The W-phase terminal 28 is provided at an end portion of the W-phase power line 24a.

The U-phase terminal 26 is provided by welding a member having a ring-like portion that can be bolted to the first U-phase connecting portion 52a (see FIG. 1, FIG. 5, etc.) of the terminal block 50 that will be described in more detail later, to a distal end portion of the U-phase power line 22a. Thus, a U-phase weld 26a is formed between the U-phase terminal 26 and the U-phase power line 22a. Similarly, a V-phase weld 27a is formed between the V-phase terminal 27 and the V-phase power line 23a, and a W-phase weld 28a is formed between the W-phase terminal 28 and the W-phase power line 24a.

The U-phase power line 22a, V-phase power line 23a, and W-phase power line 24a are connected via the terminal block 50 to respective-phase power supplies (not shown) of an inverter located outside the case 40, and the U-phase winding 22, V-phase winding 23, and W-phase winding 24 cooperate with each other to generate a rotating magnetic field.

Temperature Sensor Unit

Referring to FIG. 2 and FIG. 4, the temperature sensor unit 30 includes the thermistor 31, a first wire harness 32, and a second wire harness 33. The temperature sensor unit 30 detects the temperature of the stator 10, and sends the obtained temperature data to a controller (not shown) located outside the case 40. In the rotating electric machine 100, when current flows through the U-phase winding 22, V-phase winding 23, and W-phase winding 24, each winding generates heat, and the temperature of the stator 10 rises. If the temperature of the stator 10 rises to a predetermined value or higher, some of the components that constitute the stator 10 may be damaged by the heat. Thus, the temperature sensor unit 30 sends the detected temperature data to the controller, and the controller shuts off the current supplied to each winding, so as to prevent the temperature of the stator 10 from rising.

One end of the first wire harness 32 is connected to the thermistor 31, and a first connector 32a is provided at the other end of the first wire harness 32. A second connector 33a is provided at one end of the second wire harness 33, and a connecting portion (not shown) connected to an inside harness connecting portion 54a (see FIG. 5) of the terminal block 50 is provided at the other end of the second wire harness 33.

While the thermistor 31 is attached to the neutral point 29 at which the U-phase winding 22, V-phase winding 23, W-phase winding 24 are connected, as shown in FIG. 3, the mounting position in the actual stator 10 is the bottom of the lower wiring end portion 25b, as shown in FIG. 2 and FIG. 4. The thermistor 31 is coated with resin, so that it detects the temperature of the stator 10 without being affected by the ambient temperature, and is adhered to the lower wiring end portion 25b with the resin.

The first wire harness 32 and the second wire harness 33 are connected by mating of the first connector 32a with the second connector 33a. A boss 41a that extends in the vertical direction is provided on the inner circumferential wall 41 of the case 40, and a harness bracket 42 is attached to the boss 41a.

Figure 9:
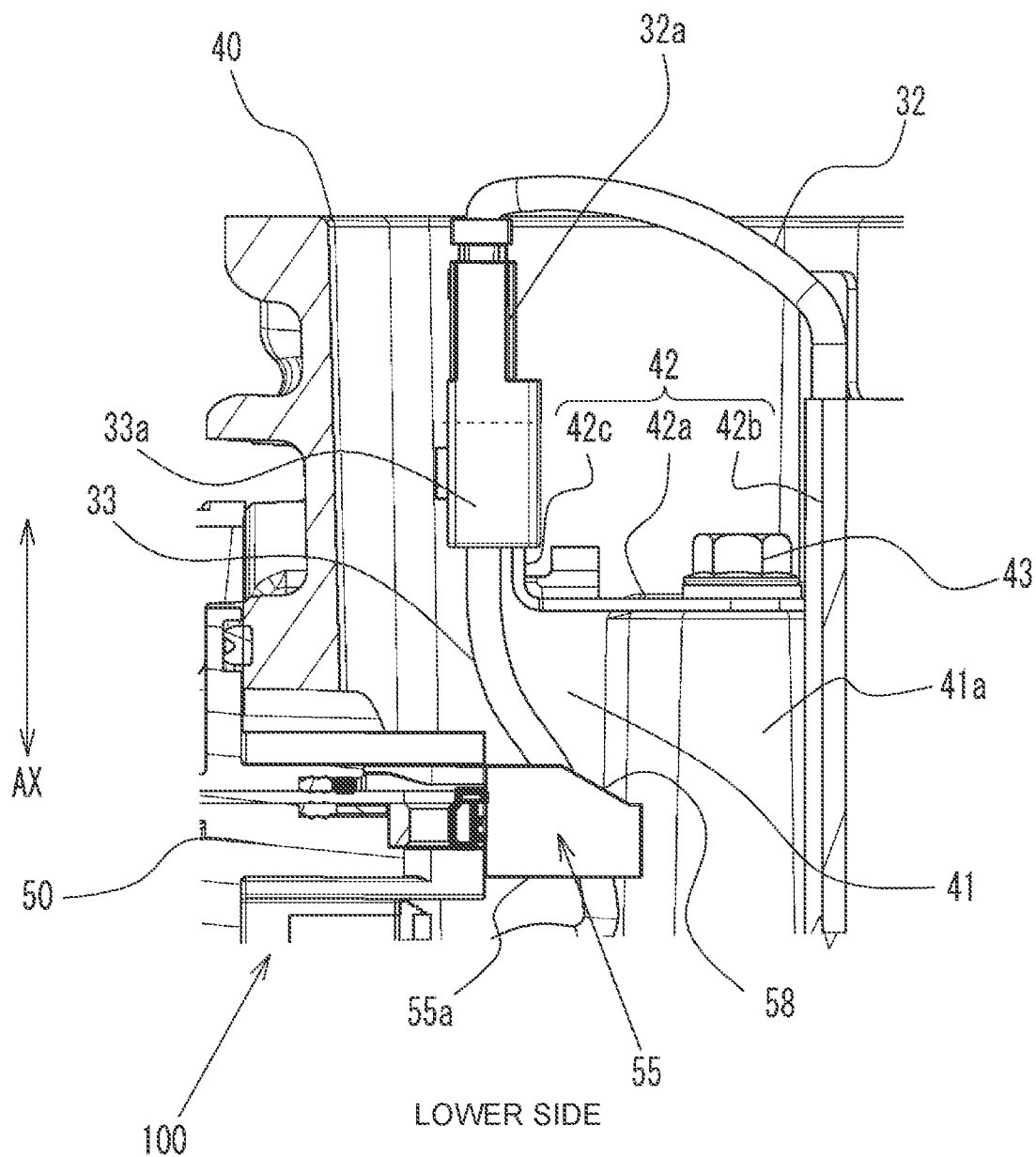
FIG. 9 is an explanatory view showing a portion of the rotating electric machine of the embodiment to which the terminal block is attached, as viewed from the inside of a case.

The harness bracket 42 has a mounting portion 42a in the form of a flat plate, a cover portion 42b connected to one end of the mounting portion 42a, and an insertion portion 42c connected to the other end of the mounting portion 42a. The mounting portion 42a is mounted on an upper end portion of the boss 41a, and is fixed to the boss 41a with a bolt 43. The cover portion 42b has two walls that extend in the vertical direction, and the two walls, along with the inner circumferential wall 41 of the case 40, form a space that extends in the vertical direction. The first wire harness 32 is arranged to pass through the space. The insertion portion 42c is provided at the other end portion of the mounting portion 42a to extend upward, and is inserted into an insertion hole (not shown) provided in the second connector 33a. Thus, the second connector 33a mated with the first connector 32a is fixed to the harness bracket 42. As shown in FIG. 2 and FIG. 9, a major part of the second wire harness 33 is located below the mounting portion 42a.

The second wire harness 33 is guided toward the inner circumferential wall 41 by means of a harness retainer 55 (see FIG. 1 and FIG. 10) as will be described in detail later. However, in FIG. 2 and FIG. 4, the stator 10 is not connected to the terminal block 50, and the terminal block 50 is not illustrated in these drawings; therefore, the second wire harness 33 is in a condition where it can get close to a power line (in particular, the U-phase power line 22a). Namely, the second wire harness 33 is in a condition where it can interfere with a power line.

Terminal Block

Figure 5:
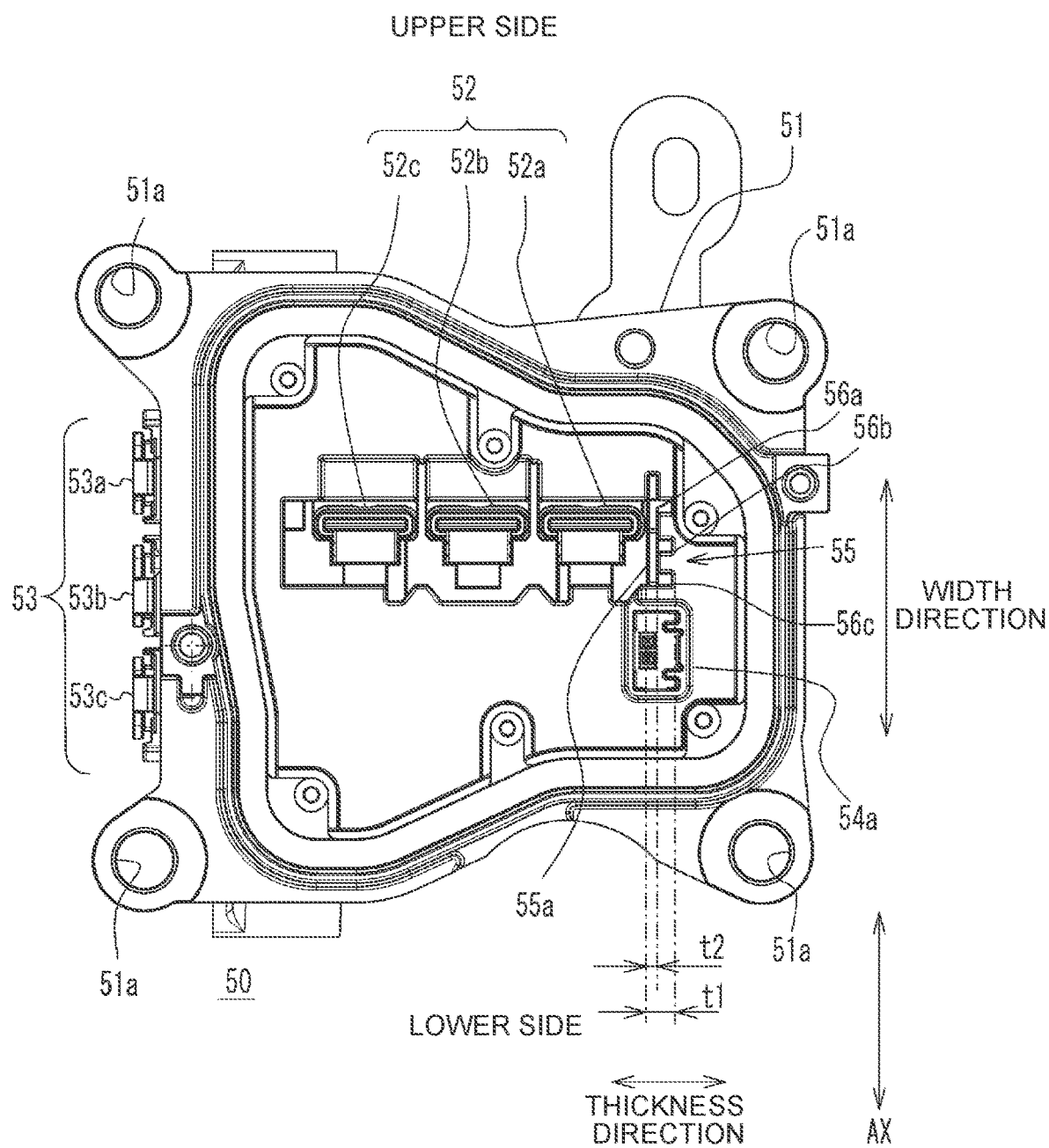
FIG. 5 is a front view of the terminal block attached to the rotating electric machine of the embodiment.
Figure 6:
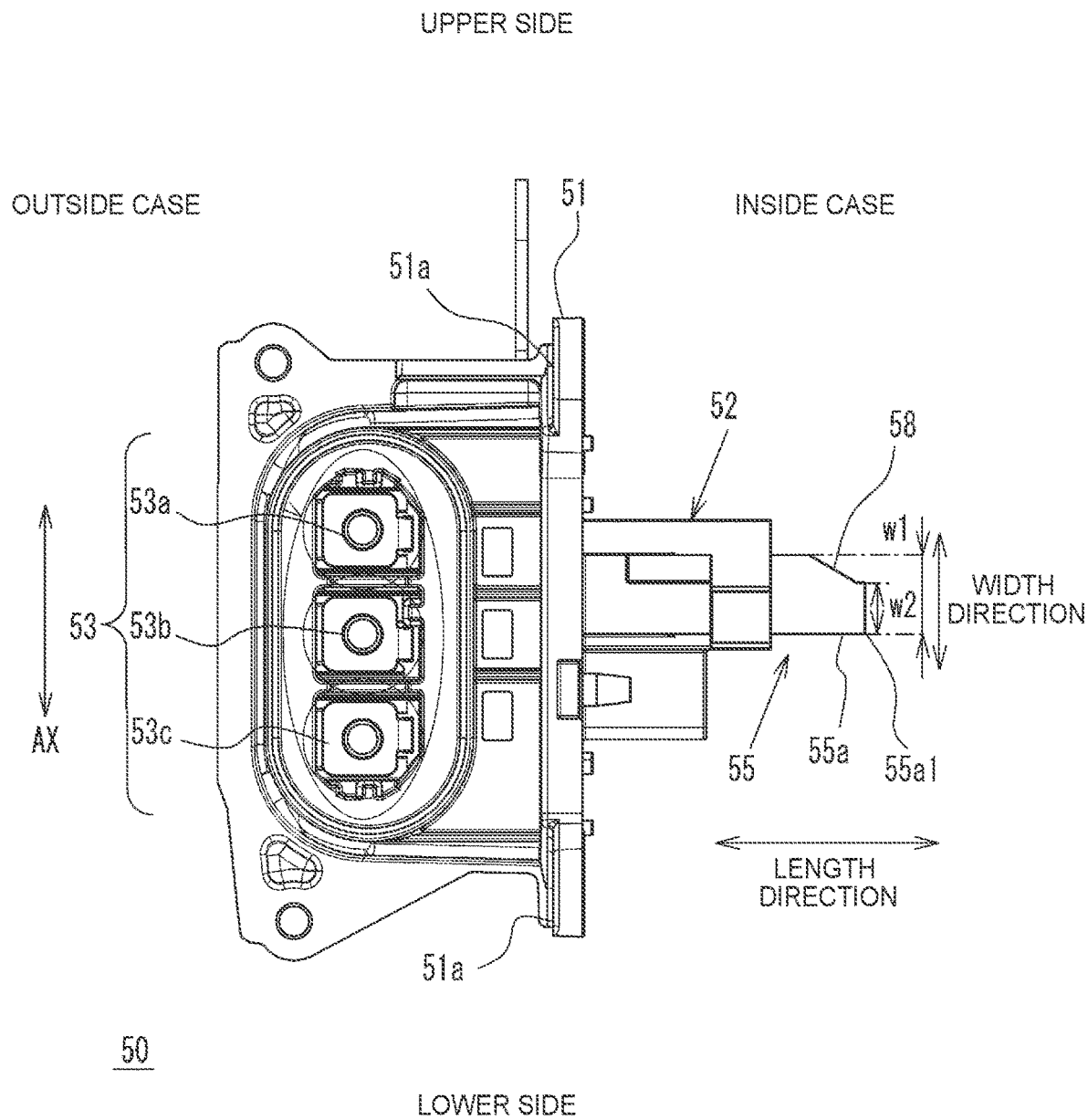
FIG. 6 is a left side view of the terminal block attached to the rotating electric machine of the embodiment.
Figure 7A:
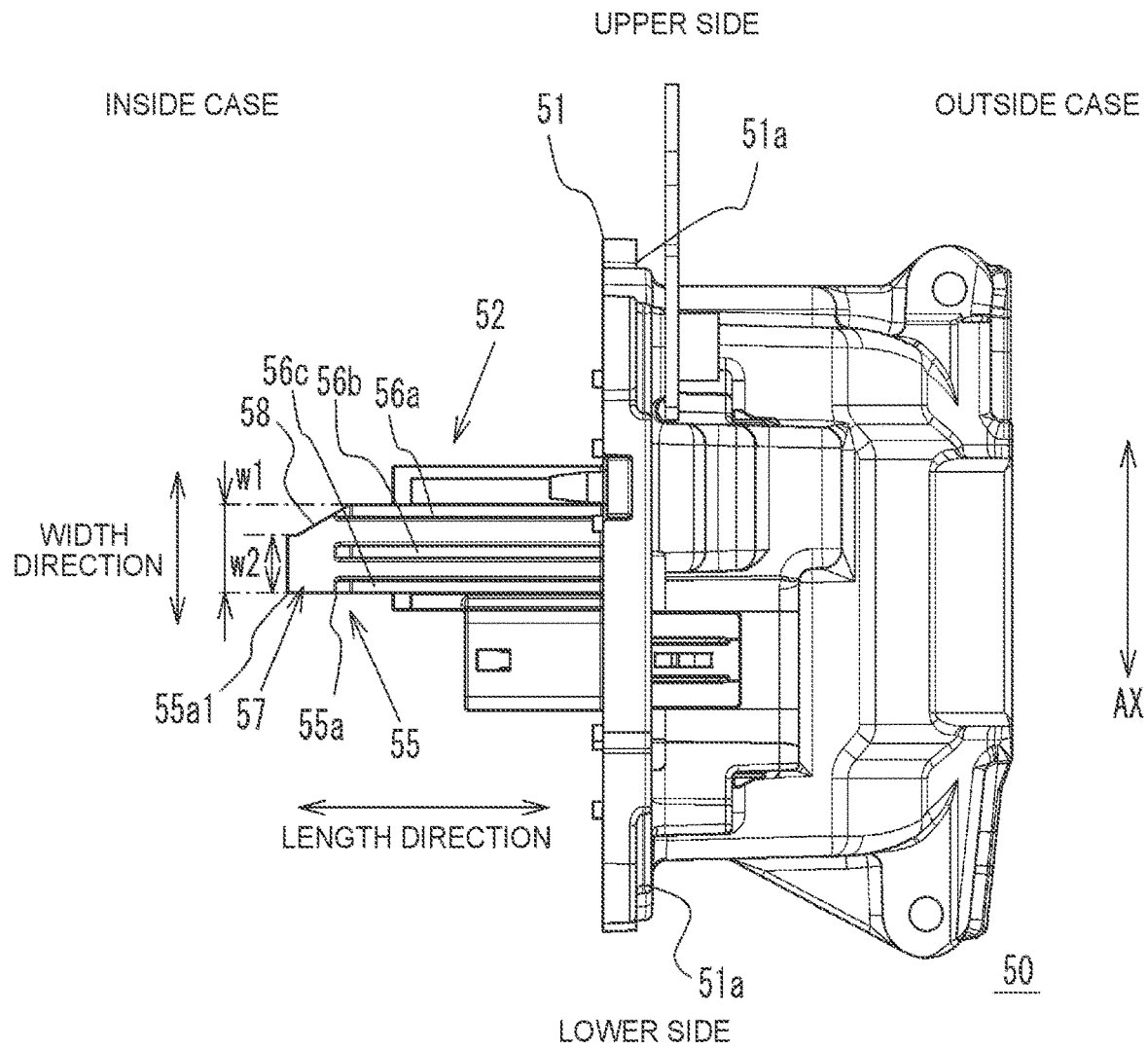
FIG. 7A is a right side view of the terminal block attached to the rotating electric machine of the embodiment.

Next, referring to FIG. 1 and FIG. 5 to FIG. 11B, the terminal block 50 will be described. The terminal block 50 can be attached to and detached from the case 40. Initially, referring to FIG. 5 to FIG. 8, the configuration of the terminal block 50 and the state of attachment to the case 40 will be described. FIG. 5 is a front view of the terminal block 50. The terminal block 50 is attached to the case 40 such that its surface appearing in the front view is located inside the case 40. FIG. 6 is a left side view of the terminal block 50. The terminal block 50 is attached to the case 40, such that the right-hand side of the terminal block 50 in FIG. 6 is located inside the case 40, and the left-hand side in FIG. 6 is located outside the case 40. FIG. 7A is a right side view of the terminal block 50. The terminal block 50 is attached to the case 40, such that the left-hand side of the terminal block 50 in FIG. 7A is located inside the case 40, and the right-hand side in FIG. 7A is located outside the case 40. FIG. 8 is a rear view of the terminal block 50. The terminal block 50 is attached to the case 40 such that its surface appearing in the rear view is located outside the case 40. The case 40 itself is not equipped with a special structure for guiding a wire harness, and any case having conventional specifications can be used as it is. Thus, the provision of the harness retainer 55 on the terminal block 50 is advantageous in terms of the cost of the rotating electric machine 100 as a whole.

The terminal block 50 includes a main body 51, the first connecting portion 52, and the second connecting portion 53. Bolt holes 51a are provided at four corners of the main body 51. The terminal block 50 is bolted to the case 40 with bolts (not shown) inserted in the bolt holes 51a.

In a condition where the terminal block 50 is attached to the case 40, the first connecting portion 52 is located inside the case 40. The first connecting portion 52 includes the first U-phase connecting portion 52a, first V-phase connecting portion 52b, and first W-phase connecting portion 52c. The U-phase terminal 26 is connected to the first U-phase connecting portion 52a with a bolt (not shown), the V-phase terminal 27 is connected to the first V-phase connecting portion 52b with a bolt (not shown), and the W-phase terminal 28 is connected to the first W-phase connecting portion 52c with a bolt (not shown).

In the condition where the terminal block 50 is attached to the case 40, the second connecting portion 53 is located outside the case 40. The second connecting portion 53 includes a second U-phase connecting portion 53a, second V-phase connecting portion 53b, and second W-phase connecting portion 53c. The second U-phase connecting portion 53a is located opposite to the first U-phase connecting portion 52a, and a cable is connected between the second U-phase connecting portion 53a and a U-phase power supply of the inverter (not shown). The second V-phase connecting portion 53b is located opposite to the first V-phase connecting portion 52b, and a cable is connected between the second V-phase connecting portion 53b and a V-phase power supply of the inverter (not shown). The second W-phase connecting portion 53c is located opposite to the first W-phase connecting portion 52c, and a cable is connected between the second W-phase connecting portion 53c and a W-phase power supply of the inverter (not shown).

The terminal block 50 includes the inside harness connecting portion 54a that is located inside the case 40 in the condition where the terminal block 50 is attached to the case 40 (see FIG. 5). A connecting portion (not shown) of the second wire harness 33 (see FIG. 2 and FIG. 4) is connected to the inside harness connecting portion 54a.

The terminal block 50 includes an outside harness connecting portion 54b that is located outside the case 40 in the condition where the terminal block 50 is attached to the case 40 (see FIG. 8). The outside harness connecting portion 54b is a portion located opposite to the inside harness connecting portion 54a, and a harness located between the outside harness connecting portion 54b and a controller (not shown) located outside the case 40 is connected to the outside harness connecting portion 54b.

Figure 7B:
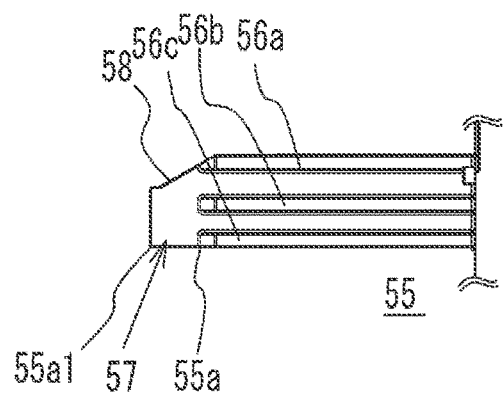
FIG. 7B is a side view of a harness retainer.
Figure 8:
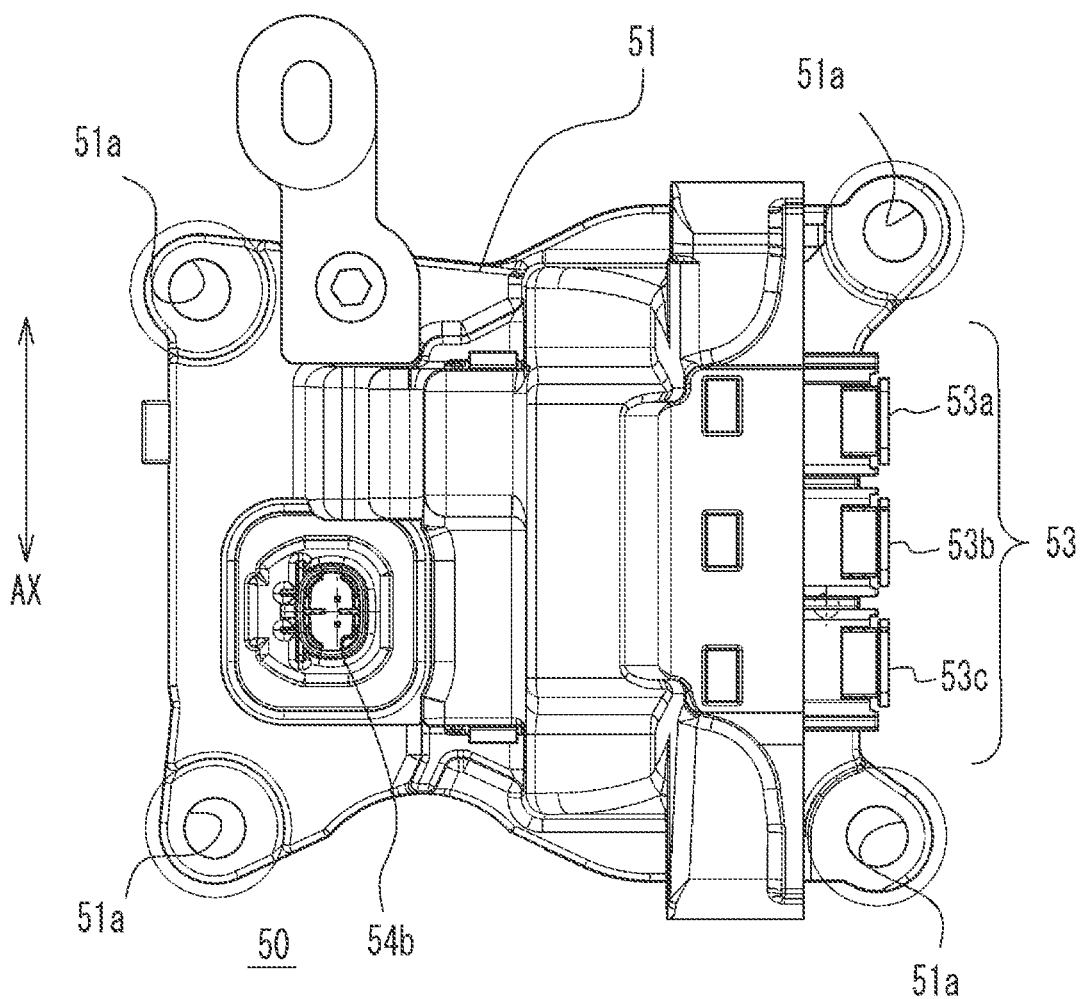
FIG. 8 is a rear view of the terminal block attached to the rotating electric machine of the embodiment.

As shown in FIG. 7A and FIG. 7B, the terminal block 50 includes the harness retainer 55. The harness retainer 55 guides the second wire harness 33 toward the inner circumferential wall 41. The harness retainer 55 includes a plate-like portion 55a that extends from the terminal block 50 toward the inside of the case 40, in the condition (see FIG. 9) where the terminal block 50 is attached to the case 40. In the following description, the length direction, width direction, and thickness direction of the plate-like portion 55a are set to those as indicated in FIG. 1, FIG. 5, and FIG. 6. The width direction coincides with the direction in which the axis AX of the stator 10 extends. The plate-like portion 55a is oriented such that its face defined by its width direction and length direction is opposed to the inner circumferential wall 41 of the case 40. Referring to FIG. 4, the U-phase terminal 26 is located closest to the inner circumferential wall 41. Thus, the first U-phase connecting portion 52a to which the U-phase terminal 26 is connected, among the connecting portions to the respective phases included in the terminal block 50, is located closest to the inner circumferential wall 41. Thus, in this embodiment, the plate-like portion 55a is provided in the vicinity of the first U-phase connecting portion 52a. The harness retainer 55, which includes the plate-like portion 55a having a certain width, can retain a certain range of the second wire harness 33, so that the harness retainer 55 can reliably guide the second wire harness 33 toward the inner circumferential wall 41. Also, the length (the amount of protrusion into the case 40) of the plate-like portion 55a is set to a value that does not allow the second wire harness 33 to fall out from between the inner circumferential wall 41 and the harness retainer 55.

Figure 10:
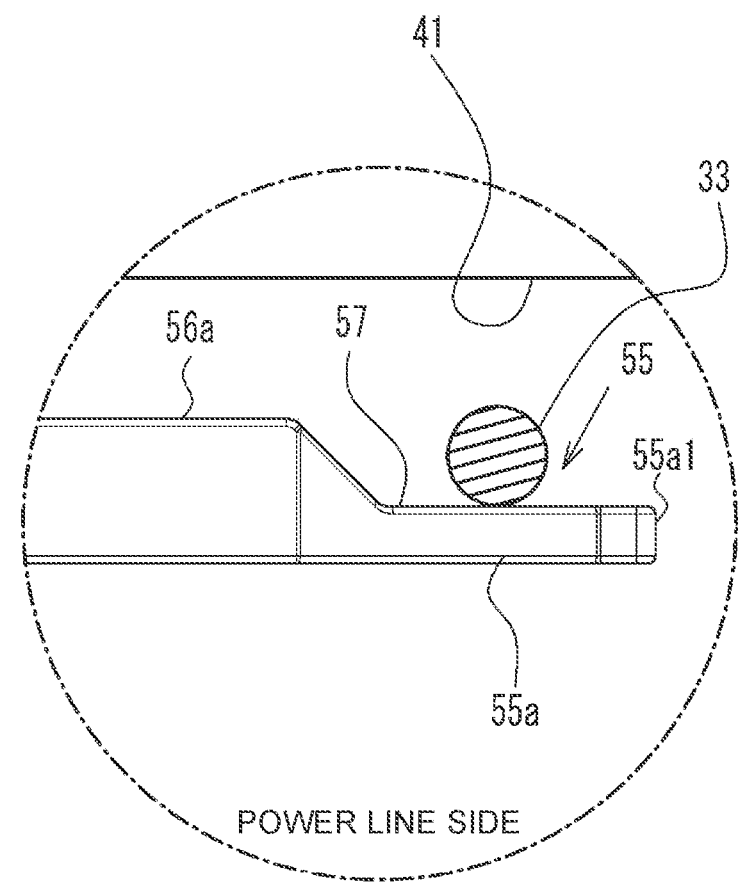
FIG. 10 is an explanatory view illustrating the positional relationship between a wire harness and the harness retainer, when the rotating electric machine is viewed from above.
Figure 11A:
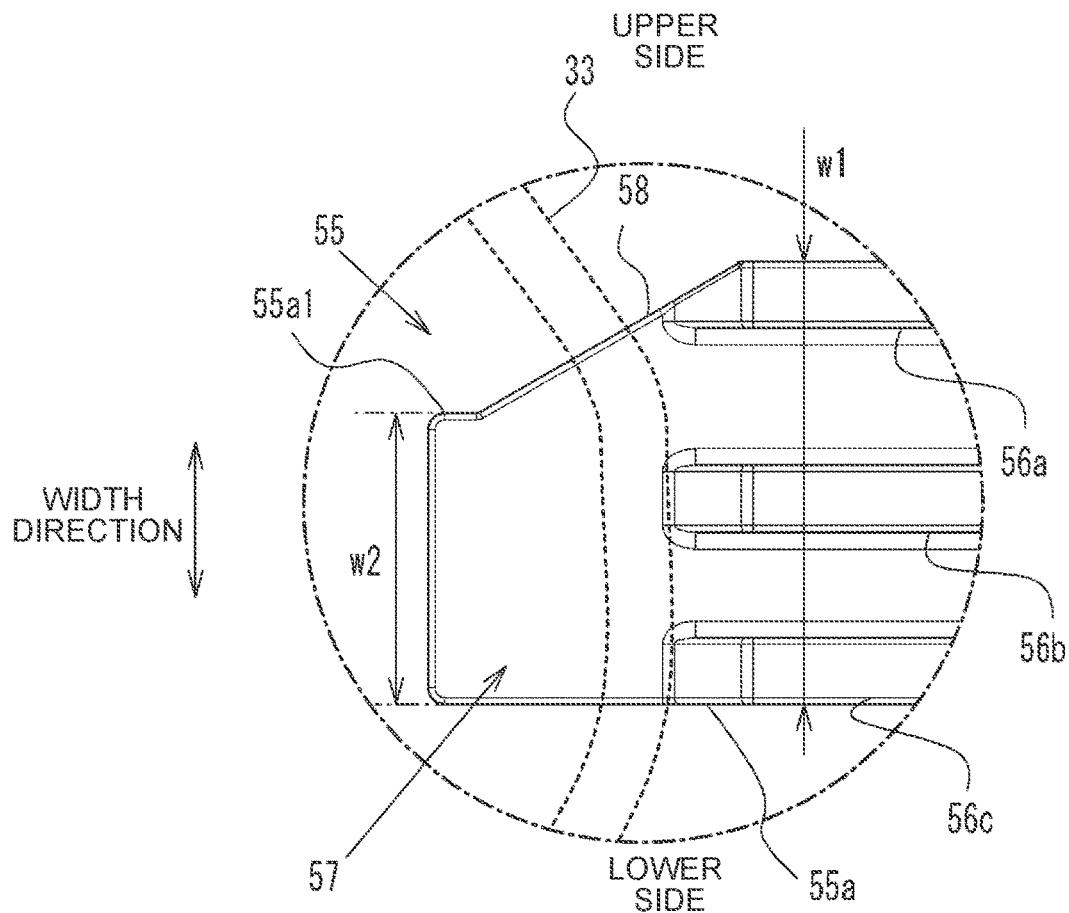
FIG. 11A is an explanatory view illustrating the positional relationship between the wire harness and the harness retainer, when the harness retainer is viewed from the inner circumferential surface of the case.
Figure 11B:
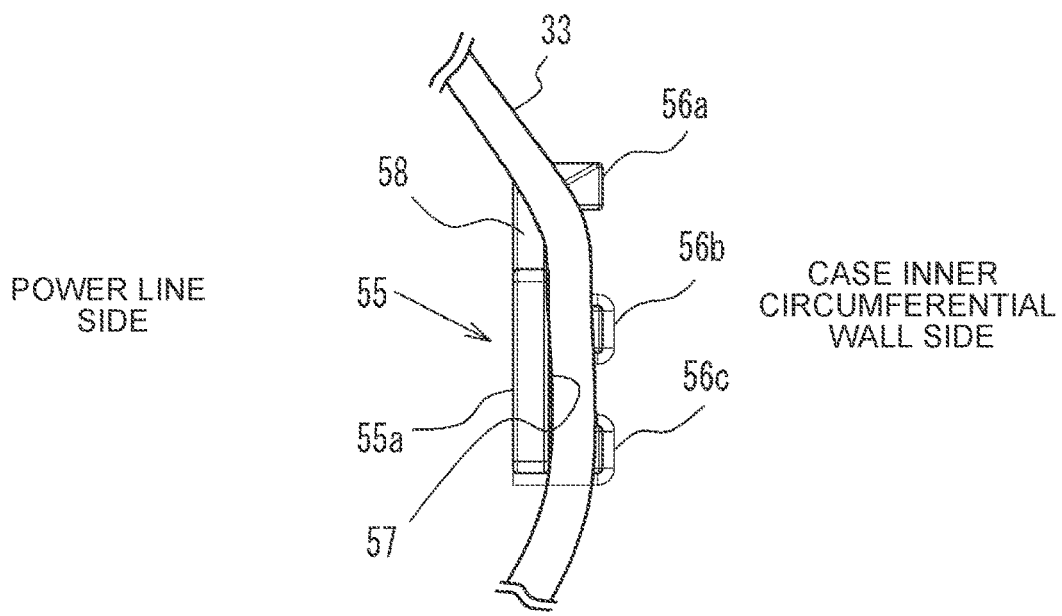
FIG. 11B is an explanatory view illustrating the positional relationship between the wire harness and the harness retainer, when the harness retainer is viewed from its distal end.

Referring to FIG. 5, FIG. 7, FIG. 11A, and FIG. 11B, three ribs that extend in the length direction, specifically, a first rib 56a, second rib 56b, and third rib 56c, are provided on the surface of the plate-like portion 55a that is opposed to the inner circumferential wall 41. The first rib 56a, second rib 56b, and third rib 56c extend in the length direction as shown in FIG. 7A, but their distal end portions do not reach a distal end portion 55a1 of the plate-like portion 55a. With this arrangement, a harness holding portion 57 is formed on the surface of the plate-like portion 55a opposed to the inner circumferential wall 41, such that the second wire harness 33 can enter the harness holding portion 57 as shown in FIG. 10 and FIG. 11A. Referring to FIG. 5, the thickness of the plate-like portion 55a measured at positions where the first rib 56a, second rib 56b, and third rib 56c are provided, including that of the ribs, is denoted as "t1". On the other hand, the thickness of the harness holding portion 57 measured at a position that is not reached by any of the ribs is denoted as "t2" that is smaller than the thickness "t1". Namely, the harness holding portion 57 is recessed away from the inner circumferential wall 41, by a difference between the thickness t1 and the thickness t2. The second wire harness 33 enters the harness holding portion 57 and is held in a stable state.

Referring to FIG. 6, FIG. 7A, and FIG. 7B, the distal end portion 55a1 of the plate-like portion 55a that forms the harness retainer 55 is provided with an inclined portion 58 of which the width of the plate-like shape is reduced toward the distal end. The width of the plate-like portion 55a at the proximal end is denoted as "w1", and the width of the distal end portion 55a1 is denoted as "w2" that is smaller than the width "w1". In this embodiment, the inclined portion 58 is provided at the upper edge of the plate-like portion 55a. With the inclined portion 58 thus provided, the force applied to the second wire harness 33 can be eased when the second wire harness 33 extending generally in the vertical direction contacts the upper edge portion of the plate-like portion 55a, and damage and wear of the second wire harness 33 can be reduced. While the inclined portion 58 is provided at the upper edge of the plate-like portion 55a in this embodiment, a similar inclined portion may be provided at the lower edge of the plate-like portion 55a.

Next, referring to FIG. 9 to FIG. 11B, the function of the harness retainer 55 will be described. Referring to FIG. 9 and FIG. 10, the second wire harness 33 is guided toward the inner circumferential wall 41 of the case 40, by the harness retainer 55 included in the terminal block 50 attached to the case 40. Namely, as shown in FIG. 10, the second wire harness 33 is located between the inner circumferential wall 41 and the harness retainer 55. Thus, the second wire harness 33 is less likely or unlikely to be pushed out toward the central portion of the case 40. As a result, the second wire harness 33 is kept spaced apart from the U-phase power line 22a, and these members are prevented from interfering from each other. With the harness retainer 55 thus provided, the second wire harness 33 is arranged along the inner circumferential wall 41, which yields a large effect of avoiding interference in the rotating electric machine 100 even where it is being downsized.

Thus, when the interference between the second wire harness 33 and the U-phase power line 22a is avoided, no force due to the interference is applied to the U-phase weld 26a that joins the U-phase power line 22a with the U-phase terminal 26. This makes it possible to avoid damage of the U-phase weld 26a and loosening of the bolt (not shown) for fixing the U-phase terminal 26. Thus, the harness retainer 55 eliminates the interference between the second wire harness 33 and the U-phase power line 22a. Then, the harness retainer 55 naturally avoids interference between the second wire harness 33, and the V-phase power line 23a and W-phase power line 24a located further inside the case 40 than the U-phase power line 22a. Consequently, damage of any weld and loosening of any bolt are avoided.

Effects

The rotating electric machine 100 of this embodiment includes the harness retainer 55 that guides the wire harness (the second wire harness 33) that extends from the thermistor 31, toward the inner circumferential wall 41 of the case 40. Thus, it is possible to avoid interference between the second wire harness 33 and the wirings (the U-phase winding 22, V-phase winding 23, W-phase winding 24) extending from the stator 10. Thus, damage of the welds between the windings and the terminals and loosening of the terminals can be reduced or curbed.

The harness retainer 55 is provided in the terminal block 50 provided on the case 40. Thus, no change is needed in design of the case itself, which is advantageous in terms of the cost.

The harness retainer 55, which has a plate-like shape, can hold down a certain range of the second wire harness 33, and can reliably guide the second wire harness 33 toward the inner circumferential wall 41.

The harness retainer 55 includes the inclined portion 58 in its distal end portion, so that wear and damage of the second wire harness 33 itself can be reduced.

The harness retainer 55 includes the harness holding portion 57 that allows the second wire harness 33 to enter, on the surface opposed to the inner circumferential wall 41 of the case 40. Thus, the harness retainer 55 can stably hold the second wire harness 33.

Modified Examples

The harness retainer 55 of this embodiment, which includes the plate-like portion 55a having a certain width, holds down a certain range of the second wire harness 33. On the other hand, the harness retainer may include two or more rod-like portions arranged in parallel in the vertical direction, for example, and the rod-like portions may guide the second wire harness 33 toward the inner circumferential wall 41.

In the case where a new case is set, the inner circumferential wall of the case may be provided in advance with a portion that guides a wire harness toward the inner circumferential wall.

The above embodiments are mere examples for carrying out the disclosure. The disclosure is not limited to these embodiments, and various modifications of the embodiments are within the scope of the disclosure. Furthermore, it is apparent from the above description that various other embodiments are possible within the scope of the disclosure.

What is claimed is:

1. A rotating electric machine comprising:
a stator from which a power line is pulled out, the stator being housed in a case;
a temperature sensing element provided on the stator; and
a harness retainer configured to guide a wire harness that extends from the temperature sensing element, toward an inner circumferential wall of the case, wherein:
the harness retainer is provided in a terminal block provided on the case, the power line pulled out from the stator being connected to the terminal block, and
the harness retainer has a plate shape that extends from the terminal block to an inside of the case.

2. The rotating electric machine according to claim 1, wherein the harness retainer includes an inclined portion where a width of the plate shape is reduced toward a distal end portion, when a direction parallel to a direction in which an axis of the stator extends is regarded as a direction of the width.

3. The rotating electric machine according to claim 1, wherein the harness retainer includes a harness holding portion on a surface opposed to the inner circumferential wall of the case, the harness holding portion being configured to allow the wire harness to enter.

* * * * *